United States Patent
Iwabuchi et al.

(10) Patent No.: US 6,211,307 B1
(45) Date of Patent: Apr. 3, 2001

(54) ORGANOPOLYSILOXANE COMPOSITION FOR FORMING FIRED FILM

(75) Inventors: Motoaki Iwabuchi; Masaaki Yamaya, both of Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/417,089

(22) Filed: Oct. 13, 1999

(30) Foreign Application Priority Data

Oct. 14, 1998 (JP) .................................................. 10-291833

(51) Int. Cl.$^7$ .................................................. C08G 77/18
(52) U.S. Cl. ........................... 525/477; 528/39; 556/458; 427/126.2; 106/287.16; 106/287.13
(58) Field of Search .................... 427/126.2; 106/287.13, 106/287.16; 525/477; 528/39; 556/458

(56) References Cited

U.S. PATENT DOCUMENTS

| | | |
|---|---|---|
| 3,719,630 | 3/1973 | Antonen . |
| 4,774,297 * | 9/1988 | Murakami et al. . |
| 5,116,637 * | 5/1992 | Baney et al. . |
| 5,441,811 | 8/1995 | Lin et al. . |
| 5,506,288 | 4/1996 | Lin et al. . |
| 5,611,884 * | 3/1997 | Bearinger et al. . |
| 5,707,683 * | 1/1998 | Currie et al. . |

FOREIGN PATENT DOCUMENTS

| | | |
|---|---|---|
| 195 06 264 | 9/1995 | (DE) . |
| 0 460 868 | 12/1991 | (EP) . |
| 0 576 164 | 12/1993 | (EP) . |
| 0 791 567 | 8/1997 | (EP) . |
| 2287034 | 9/1995 | (GB) . |
| 49-39161 | 10/1974 | (JP) . |
| 7-310016 | 11/1995 | (JP) . |
| 2686033 | 8/1997 | (JP) . |

OTHER PUBLICATIONS

M.B. Neiman, Deterioration of Polymers—Mechanism and Prevention—, Sangyo Tosho K.K., pp. 270–271 and 276.
European Search Report, dated Jan. 11, 2000.

* cited by examiner

Primary Examiner—Robert Dawson
Assistant Examiner—Kuo-Liang Peng
(74) Attorney, Agent, or Firm—Millen, White, Zelano & Branigan, P.C.

(57) ABSTRACT

An organopolysiloxane composition comprising (A) 80–95 parts by weight of a silicone resin comprising units of $R_3SiO_{1/2}$ and $SiO_{4/2}$ in a molar ratio of from 0.6/1 to 1.1/1, wherein R typically represents methyl, (B) 5–20 parts by weight of a diorganopolysiloxane, and (C) from more than 40 to 500 parts by weight of an organic solvent is applied to various substrates and fired into a ceramic film having improved heat resistance and adhesion.

19 Claims, No Drawings

ORGANOPOLYSILOXANE COMPOSITION FOR FORMING FIRED FILM

This invention relates to organopolysiloxane compositions suitable for forming fired film layers on various substrates.

BACKGROUND OF THE INVENTION

Coating films of silicone resins can impart desired properties such as weather resistance, chemical resistance, impact resistance, heat resistance, freeze resistance and adhesion by a choice of a proper resin. The silicone resins are required to ensure formation of a coating by application, firm adhesion to a substrate, ease of working, and formation of ceramic films by firing at or above 400° C. None of currently available silicone resins satisfy all the requirements.

Typical of the prior art is a composition comprising a resin of T units (R—$SiO_{3/2}$) and a sol of Q units ($SiO_{4/2}$).

This composition is used in forming a ceramic film since organic groups attached to silicon are less and a large amount of $SiO_2$ is left after curing. For example, U.S. Pat. No. 4,027,073 discloses a hard coat composition comprising (i) colloidal silica and (ii) a partial condensate of Si—$(OH)_3$ units. This composition is improved in coating formation and substrate adhesion, but can form only a very thin film because of a low viscosity and low solids. If this coating is fired in order to form a ceramic film, the coating will crack or even disappear. Since organic groups attached to all the units of the resin burn upon firing, there occur volume shrinkage and gas evolution, by which the film can be cracked.

JP-B 49-39161 discloses a solvent-free liquid organic silicone resin in the form of a liquid silicone resin of T units serving as a ceramic precursor. This resin is improved in adaptation and adhesion to the substrate surface and formation of a thick film by firing, but from the working standpoint, it has a drawback that cross-linking prior to firing is necessary. Since the resin of the cross-linking cure type forms an integrated film by cross-linking reaction prior to firing, the film cannot accommodate the distortion caused by volume shrinkage upon firing and thus tends to crack.

Another silicone resin which can be fired is a MQ resin (MQR) in which the nucleus of a polycondensate of Q units is end-blocked with M units ($R_3SiO_{1/2}$). Since the MQR has $SiO_2$ at the center nucleus, it can be readily fired into ceramic. However, the MQR is a less agglomerative, less heat softening solid by itself and thus has a low film-forming capability so that the MQR is difficult to use as a coating material as such. Therefore, on use, the MQR is usually mixed with a diorganopolysiloxane and an organic solvent to form an elastomer-forming solution. Its well-known application is a pressure-sensitive adhesive (PSA).

One typical example of the silicone PSA is a composition comprising 40 to 80 parts by weight of MQR and 20 to 60 parts of a diorganopolysiloxane as disclosed in Japanese Patent No. 2686033. Since the coatability, adaptability and adhesion to the substrate surface and thick film formation are intended, this composition must contain a relatively large proportion of the diorganopolysiloxane. In the working examples, MQR and the diorganopolysiloxane are used in a weight ratio between 68/32 and 58/42. Compositions containing a higher proportion of MQR are not described. Since the PSA composition is designed to exert tack below the pyrolysis temperature, film formation by firing is not considered. If this composition is fired, the diorganopolysiloxane accounting for a relatively large proportion of the composition decomposes and volatilizes (see M. B. Neiman, De terioration of Polymers—Mechanism and Prevention—, Sangyo Tosho K. K., pp. 270–271 and 276), forming voids in the fired film. The resulting film is of low strength.

Furthermore, JP-A 7-310016 discloses a high solids silicone composition comprising (i) 50 to 90 parts by weight of MQR and (ii) 10 to 50 parts by weight of an alkenyl-containing diorganopolysiloxane. This composition may contain an organic solvent as an optional component. However, since the important advantage of this patent is the high solids, the amount of solvent is limited to 40 parts by weight or less per 100 parts by weight of the solids. No reference is made to the film formation, substrate adhesion and workability of a composition containing a more amount of the solvent. The weight ratio of MQR/diorganopolysiloxane is most preferably from 50/50 to 80/20. No compositions containing MQR in excess of 80/20 are prepared in the working examples. The only application described is addition curable PSA. An adhesion test is carried out in every working example. These apparently indicate that the composition was developed solely as a solventless or low solvent type PSA.

SUMMARY OF THE INVENTION

An object of the invention is to provide an organopolysiloxane composition which can be applied onto various substrates and fired into a heat resistant, firmly bonded film and which can also function as a modifying binder when organic and inorganic materials are fired.

Searching for a composition which can form a crack-free, strain-free uniform coating film when fired at high temperatures of at least 400° C., the inventor has found a composition comprising a silicone resin containing a large proportion of compatible Q units, a diorganopolysiloxane, and an organic solvent as main components.

The invention provides an organopolysiloxane composition suitable for forming a fired film, comprising (A) 80 to 95 parts by weight of a silicone resin, (B) 5 to 20 parts by weight of a diorganopolysiloxane, the amount of components (A) and (B) combined being 100 parts by weight, and (C) from more than 40 to 500 parts by weight of an organic solvent. The silicone resin (A) is one comprising units of $R_3SiO_{1/2}$ and units of $SiO_{4/2}$ in a molar ratio of from 0.6/1 to 1.1/1, wherein R, which may be the same or different, represents hydrogen, hydroxyl groups, alkoxy groups of 1 to 6 carbon atoms, or monovalent hydrocarbon groups of 1 to 6 carbon atoms. The diorganopolysiloxane (B) is represented by the general formula (1):

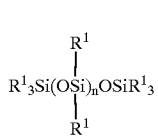

(1)

wherein $R^1$, which may be the same or different, represents hydrogen, hydroxyl groups, alkoxy groups of 1 to 6 carbon atoms, or monovalent hydrocarbon groups of 1 to 12 carbon atoms, and n is an integer of at least 1.

This composition is easy to form a uniform thin coating on a substrate when applied onto the substrate alone or after admixing with an organic or inorganic material. The coating can be fired into a fully uniform ceramic film. Although the theory is not well understood, it is believed that the organic solvent maintains the silicone resin and the diorganopolysiloxane in a uniformly dissolved state at an early stage of heating. As the coating is heated to volatilize the organic solvent, a uniform silicone coating forms on the substrate without segregation of either the silicone resin or the diorganopolysiloxane. As the coating is further heated and fired, a transition to the firing step takes place while maintaining the coating shape of the uniform composition. During the process, the diorganopolysiloxane does not cause localization of the MQR because of mutual high compatibility.

The drawback of the diorganopolysiloxane is that it is less compatible with most inorganic materials and organic polymers because of its very low surface tension. When the diorganopolysiloxane is used as a binder for firing, segregation occurs and a uniform film cannot be formed. According to the invention, by limiting the content of the diorganopolysiloxane to a lower level, a good compromise is established between the function of a firing binder and the formation of a uniform ceramic film. Further, since the majority of the diorganopolysiloxane is decomposed and volatilized off by firing, the low content of diorganopolysiloxane had the additional advantage that the generation of voids in the film being fired is suppressed and the strength of the film is not impaired.

DESCRIPTION OF THE PREFERRED EMBODIMENTS

Component (A) is a silicone resin which essentially contains $R_3SiO_{1/2}$ units and $SiO_{4/2}$ units in a molar ratio of from 0.6/1 to 1.1/1 in its skeleton. The silicone resin may further contain $R_2SiO_{2/2}$ units and $RSiO_{3/2}$ units as long as such additional units do not compromise the compatibility of the silicone resin with the diorganopolysiloxane and organic solvent.

The silicone resin used herein is represented by the general formula:

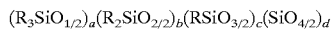
$(R_3SiO_{1/2})_a(R_2SiO_{2/2})_b(RSiO_{3/2})_c(SiO_{4/2})_d$ wherein $0.6 \leq a/d \leq 1.1$, and contains $R_3SiO_{1/2}$ and $SiO_{4/2}$ units as main constituent units. Preferably, a to d are $0.20 \leq a \leq 0.55$, $0 \leq b \leq 0.40$, $0 \leq c \leq 0.40$, $0.29 \leq d \leq 0.65$, and $a+b+c+d=1$. With $a/d<0.6$, the silicone resin tends to polymerize to a higher molecular weight when prepared, and due to a lower proportion of the $R_3SiO_{1/2}$ units contributing to the compatibility with the diorganopolysiloxane and organic solvent, the silicone resin becomes less compatible and difficult to form a uniform coating. With $a/d>1.1$, the silicone resin is likely to volatilize upon firing because of a low degree of polymerization, resulting in a fired film having a reduced strength. A silicone resin having a greater proportion of $R_2SiO_{2/2}$ and $RSiO_{3/2}$ units experiences a greater volume shrinkage and gas evolution upon firing because of burning of organic groups and is likely to crack. Therefore, the silicone resin should preferably satisfy $(a+d)/(a+b+c+d) \geq 0.6$.

When fired, all silicone resins having various combinations of constituent units are oxidized to $SiO_{4/2}$ units to form coating films. However, a silicone resin consisting essentially of $R_3SiO_{1/2}$ and $SiO_{4/2}$ units forms a more satisfactory fired film. This silicone resin is believed to have at the center a polymerized nucleus of $SiO_{4/2}$ units around which $R_3SiO_{1/2}$ units are silylated. Since the $R_3SiO_{1/2}$ units enclosing the molecule are compatible with the diorganopolysiloxane, the resin not only forms a uniform coating when applied, but also when fired, maintains a uniform film shape at high temperatures by virtue of the mechanism that the $R_3SiO_{1/2}$ units readily move through the softened diorganopolysiloxane.

The silicone resin (A) may be modified or copolymerized with another resin (other than silicone resins) as long as the other resin does not compromise the compatibility of the silicone resin with the diorganopolysiloxane and organic solvent. Illustrative other resins include polyether imides, polycarbonate, polyphenylene ether, polyphenylene sulfide, polysulfone, polyether sulfone, polyether ketone, polyether ether ketone, polytetrafluoroethylene, polydifluoroethylene, polystyrene, ABS resins, epoxy resins, phenolic resins, and urethane resins. However, the silicone resin is preferably used as such.

As mentioned above, the silicone resin contains $R_3SiO_{1/2}$ and $SiO_{4/2}$ units as essential constituent units and optionally, $R_2SiO_{2/2}$ and $RSiO_{3/2}$ units. Herein, R represents hydrogen, hydroxyl groups, alkoxy groups of 1 to 6 carbon atoms, or monovalent hydrocarbon groups of 1 to 6 carbon atoms. The R groups may be the same or different. Exemplary alkoxy groups are methoxy, ethoxy, propoxy, and butoxy groups. Exemplary monovalent hydrocarbon groups include alkyl groups such as methyl, ethyl, propyl, butyl and hexyl, alkenyl groups such as vinyl, allyl, propenyl, butenyl and hexenyl, and phenyl groups. Of these, methyl is preferred because it imparts more compatibility with the diorganopolysiloxane and leads to a reduced weight loss. It is also acceptable to introduce crosslinkable reactive groups for the purpose of enabling modification or copolymerization with another resin (other than silicone resins).

The silicone resin (A) can be prepared using hydrolyzable silanes of the general formula:

$R_aSiX_{4-a}$ wherein X is a hydrolyzable group and a is 0 to 4, a partial hydrolyzate thereof, sodium silicate or a mixture thereof. The hydrolyzable groups on the hydrolyzable silanes include alkoxy, chloro, acetoxy, isopropenoxy, oxime and similar groups.

Hydrolyzable silanes having 1 to 4 hydrolyzable groups may be used. Of these, silanes having 1 and 4 hydrolyzable groups are essential while silanes having 2 and 3 hydrolyzable groups are optional. These silanes are used in such amounts that the molar ratio of $R_3SiO_{1/2}$ to $SiO_{4/2}$ units may range from 0.6 to 1.1. Illustrative examples of the hydrolyzable silanes include vinyltrichlorosilane, vinyltrimethoxysilane, vinyltriethoxysilane, vinylmethyldichlorosilane, vinylmethyldimethoxysilane, vinylmethyldiethoxysilane, 5-hexenyltrimethoxysilane, 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-(meth)acryloxypropyltrimethoxysilane, 3-(meth)acryloxypropyltriethoxysilane, 3-(meth)acryloxypropylmethyldimethoxysilane, 3-(meth)acryloxypropylmethyldiethoxysilane, 4-vinylphenyltrimethoxysilane, 3-(4-vinylphenyl)-propyltrimethoxysilane, 4-vinylphenylmethyltrimethoxysilane, 3-aminopropyltrimethoxysilane, 3-aminopropyltriethoxysilane, 3-aminopropylmethyldimethoxysilane, 3-aminopropylmethyldiethoxysilane, 3-(2-aminoethyl)aminopropyltrimethoxysilane, 3-mercaptopropyltrimethoxysilane, 3-mercaptopropyltriethoxysilane, 3-mercaptopropylmethyldimethoxysilane, 3-mercaptopropylmethyldiethoxysilane, tetrachlorosilane, tetramethoxysilane, tetraethoxysilane, tetrabutoxysilane, methyltrichlorosilane, methyltrimethoxysilane, methyltriethoxysilane, methyltriisopropoxysilane, methyltributoxysilane, methyltriisopropenoxysilane, dimethyldichlorosilane, dimethyldimethoxysilane, dimethyldiethoxysilane, dimethyldiisopropoxysilane, dimethyldibutoxysilane, dimethyldiisopropenoxysilane, trimethylchlorosilane, trimethylmethoxysilane, trimethylethoxysilane, trimethylisopropenoxysilane, ethyltrichlorosilane, ethyltrimethoxysilane, propyltrichlorosilane, butyltrichlorosilane, butyltrimethoxysilane, hexyltrichlorosilane, hexyltrimethoxysilane, decyltrichlorosilane, decyltrimethoxysilane, phenyltrichlorosilane, phenyltrimethoxysilane, cyclohexyltrichlorosilane, cyclohexyltrimethoxysilane, propylmethyldichlorosilane, propylmethyldimethoxysilane, hexylmethyldichlorosilane, hexylmethyldimethoxysilane, phenylmethyldichlorosilane, phenylmethyldimethoxysilane, diphenyldichlorosilane, diphenyldimethoxysilane, and dimethylphenylchlorosilane. Any sodium silicate may be used as long as it has the composition $xNa_2 \cdot ySiO_2$. Among others, water glass is preferably used because it is commercially manufactured in a large scale and easily available.

The silicone resin (A) preferably has a weight average molecular weight (Mw) of about 1,600 to 30,000, and more preferably about 3,000 to 10,000. With Mw<1,600, a coating film after firing would have a low strength. With Mw>30,000, the silicone resin would be less compatible with the diorganopolysiloxane and difficult to uniformly apply, resulting in a non-uniform coating film after firing.

Any well-known polymerization method may be used in preparing the silicone resin (A). For example, hydrolytic reaction, siloxane equilibration reaction, cationic reaction, and anionic reaction are applicable. For preparing a silicone resin capable of forming a uniform fired film, hydrolytic reaction and siloxane equilibration reaction are especially preferable because siloxane linkages which are not readily severed upon firing can be formed.

Component (B) is a diorganopolysiloxane which upon firing, functions to promote the flow of the silicone resin (A) to thereby form a uniform coating. It is thus preferred that the diorganopolysiloxane does not volatilize until the silicone resin (A) starts to form a layer. More preferably, the diorganopolysiloxane is a polymer maintaining a viscosity even at high temperatures. From these points of view, the invention uses a diorganopolysiloxane represented by the general formula (1).

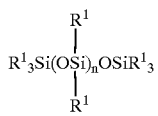

(1)

Herein $R^1$ represents hydrogen, hydroxyl groups, alkoxy groups of 1 to 6 carbon atoms, or monovalent hydrocarbon groups of 1 to 12 carbon atoms, preferably 1 to 6 carbon atoms, the $R^1$ groups may be the same or different, and n is an integer of at least 1, and preferably 1 to 20,000.

Exemplary monovalent hydrocarbon groups represented by $R^1$ include alkyl groups such as methyl, ethyl, propyl, butyl, hexyl, octyl and decyl, alkenyl groups such as vinyl, allyl, propenyl, butenyl and hexenyl, aryl groups such as phenyl and tolyl, and aralkyl groups such as benzyl and phenylethyl, and substituted ones of these groups wherein hydrogen atoms directly attached to carbon atoms are replaced by halogen atoms (e.g., fluorine), epoxy, amino and other groups.

It is preferred that at least 90 mol % of $R^1$ groups be methyl because methyl leads to a reduced weight loss upon sintering.

Preferably, the diorganopolysiloxane (B) has a viscosity of at least 5,000 mPa·s at 25° C. and more preferably at least 100,000 mpa·s at 25° C. while it may be gum-like.

The diorganopolysiloxane (B) may contain $RSiO_{3/2}$ and $SiO_{4/2}$ units insofar as the compatibility of the diorganopolysiloxane (B) with the silicone resin and organic solvent is not impaired. For maintaining the compatibility of the diorganopolysiloxane (B) with the silicone resin and organic solvent, it is preferred that the total number of $RSiO_{3/2}$ and $SiO_{4/2}$ units is up to 5 mol % of the recurring siloxane units of the diorganopolysiloxane (B).

The composition of the invention is to be applied to an article and then fired to form a ceramic coating film on the article. If a crosslinked coating is formed at the application step preceding the firing step, then the coated article becomes easy to handle and a coating film of a uniform thickness is effectively formed at the end of firing. Such a crosslinked coating is preferably formed by using a mixture of a first diorganopolysiloxane having at least one alkenyl group and a second diorganopolysiloxane having at least one hydrogen atom directly attached to a silicon atom (SiH group) as the diorganopolysiloxane (B) and effecting hydrosilylation reaction to induce crosslinking. In this embodiment, the second diorganopolysiloxane having at least one SiH group should preferably have a viscosity of up to 1,000 mPa·S at 25° C. It is more preferred that alkenyl groups account for 0.01 to 10 mol % of the entire $R^1$ groups in the diorganopolysiloxane (B), and the ratio of hydrogen atoms directly attached to silicon atoms to alkenyl groups range from 0.01 to 100. If alkenyl groups are less than 0.01 mol %, there would be achieved little crosslinking effect. If alkenyl groups are more than 10 mol %, no further improvement in the crosslinking effect would be achieved. If the ratio of hydrogen atoms directly attached to silicon atoms to alkenyl groups is less than 0.01, there would be achieved less crosslinking effect. If the ratio is above 100, no further improvement in the crosslinking effect would be achieved.

Any well-known polymerization method may be used in preparing the diorganopolysiloxane (B). For example, hydrolytic reaction, siloxane ring-opening polymerization, and equilibration reaction are applicable. More specifically, the diorganopolysiloxane (B) can be prepared by hydrolytic polymerization of a hydrolyzable silane represented by the general formula:

wherein X is a hydrolyzable group and m is 0 to 3, preferably equal to 2, ring-opening polymerization of a cyclic siloxane represented by the general formula:

wherein k is 3 to 6, or equilibration reaction of the thus obtained polysiloxane. The hydrolyzable groups on the hydrolyzable silanes include alkoxy, chloro, acetoxy, isopropenoxy, oxime and similar groups.

The organopolysiloxane composition suitable for forming a fired film contains (A) 80 to 95 parts, preferably more than 80 to 95 parts, and more preferably 85 to 95 parts by weight of the silicone resin and (B) 5 to 20 parts, preferably 5 to less than 20 parts, and more preferably 5 to 15 parts by weight of the diorganopolysiloxane, provided that the total of components (A) and (B) is 100 parts by weight. A composition containing less than 5 parts by weight of the diorganopolysiloxane (B) would form a non-uniform coating when applied. A composition containing more than 20 parts by weight of the diorganopolysiloxane (B) would result in a film with poor strength after firing and when used in admixture with another inorganic substance or organic polymer, give rise to the problem of segregation, failing to provide a uniform film after firing.

It is noted that when the silicone resin modified or copolymerized with another resin is used, the silicone resin prior to the modification or copolymerization should fall in the above-defined range relative to the diorganopolysiloxane.

In the practice of the invention, the above-described components (A) and (B) are dissolved in an organic solvent (C) to form a composition to be applied. The organic solvent (C) is an essential component for assisting in or promoting the uniform mixing of the silicone resin (A) and the diorganopolysiloxane (B), the uniform mixing of them with another inorganic substance or organic polymer, and the formation of a uniform coating. Useful solvents include aliphatic hydrocarbons, aromatic hydrocarbons, alcohols, ketones, and esters. The solvent should allow the silicone resin (A) and the diorganopolysiloxane (B) to be fully dissolved and preferably avoid separation or segregation when an inorganic substance or organic polymer is mixed. It is preferable for the solvent to volatilize below the firing temperature, typically below 300° C. Specifically, aliphatic C6–C12 hydrocarbons, benzene, toluene and xylene are preferable.

Per 100 parts by weight of the silicone resin (A) and the diorganopolysiloxane (B) combined, the organic solvent (C) is used in an amount of more than 40 parts to 500 parts, preferably 45 to 250 parts, and more preferably 60 to 200 parts by weight. On this basis, 40 parts by weight or less of the organic solvent (C) is difficult to uniformly dissolve the silicone resin (A) and the diorganopolysiloxane (B) and gives a composition having a too high viscosity to form a uniform coating. More than 500 parts by weight of the organic solvent (C) gives a composition having a too low viscosity and a too low solids content, which is difficult to form a fired film of the desired thickness or strength.

A curing catalyst may be contained in the organopolysiloxane composition. Any curing catalyst that can promote reaction of groups contained in component (A) and/or (B) is useful. Since the catalyst is used for the purpose of hardening a coating prior to firing, a catalyst capable of promoting curing at relatively low temperatures is preferable. Illustrative examples include platinum catalysts which catalyze the addition reaction between alkenyl groups and Si—H, metal salt catalysts of Sn, Ti, Zn, etc. which catalyze the condensation reaction of Si—OH, and peroxides and azo compounds capable of radical polymerization of hydrocarbon groups.

For the purpose of promoting the formation of a fired film and improving the properties thereof, the organopolysiloxane composition may further contain acids, alkalis, metal salts, and metal complexes.

On use, the organopolysiloxane composition is first applied onto a substrate. The substrates to which the composition is applicable include inorganic materials such as metals, ceramics, glass and carbon, heat resistant organic resins, and composites thereof. Application may be done in a conventional manner such as spray coating, dip coating, brush coating or slit coating. The thickness of the coating is selected in a wide range, preferably about 1 to 1,000 μm, and more preferably about 10 to 100 μm.

After application, the coating is fired. An appropriate firing temperature is about 200 to 700° C., and especially about 400 to 500° C. If the firing temperature is too low, the combustion of silicone would not fully take place, sometimes failing to form a ceramic film. If the firing temperature is too high, there is a risk that the ceramic film can peel off because of the differential thermal expansion between the film and the substrate. The firing time is generally about 1 to 60 minutes, and especially about 5 to 15 minutes. The firing atmosphere may be air although a nitrogen or other atmosphere is used if desired.

The film of the organopolysiloxane composition resulting from the above firing step is a ceramic film composed mainly of $SiO_2$. The substrate having the fired film formed thereon is advantageously used as a structural member of an article which is required to be heat and corrosion resistant, a matrix of an article to be patterned by etching, an electrically insulating material or the like.

Also, the organopolysiloxane composition of the invention functions as a modifying binder when organic or inorganic materials are fired. Exemplary organic materials are polytetrafluoroethylene (Teflon®), polyesters, polyamides, polyimides, polyolefins, and celluloses, and exemplary inorganic materials are metal powders, metal oxides, ceramic powders, mica, and silica. An admixture of such an organic or inorganic material and the organopolysiloxane composition as the binder is preferably fired under approximately the same conditions as described above although the exact firing conditions vary with the type of organic or inorganic material.

There has been described an organopolysiloxane composition which can be applied to various substrates and fired into a film having improved heat resistance and adhesion.

EXAMPLE

Examples of the invention are given below by way of illustration and not by way of limitation. Note that acronym IV is an intrinsic viscosity, M is a molecular weight, and Me is methyl.

The measurement of physical properties and tests used in Examples are as described below.
Weight average molecular weight (Mw)

The weight average molecular weight of a silicone resin was measured by means of a GPC instrument (by Tosoh K. K.) using a column series of TSK gel G2000XL+G3000XL+G4000XL+GMHXL-L, toluene as the solvent, and an RI detector and calculated on the basis of styrene. The starting reactant silane left in the resin component was excluded.
$^{29}$Si—NMR analysis The ratio of constituent units of a silicone resin was determined by $^{29}$Si—NMR. The starting reactant silane left in the resin component was excluded.
Solids content The solids content of a silicone resin or diorganopolysiloxane was determined as the residual amount left after heating it in a circulating oven at 105° C. for 3 hours.
Viscosity The viscosity of a diorganopolysiloxane was measured by means of a rotating viscometer. In the case of a gum-like diorganopolysiloxane whose viscosity is unmeasurable with the rotating viscometer, the viscosity of a solution of 1 g of the diorganopolysiloxane in 100 ml of toluene was measured, and a conversion was made in accordance with the following formula.

Specific viscosity=(viscosity of diorganopolysiloxane in toluene/viscosity of toluene)−1

Specific viscosity=IV+0.3×(IV)$^2$ (see Nakamuta, Nikka, 77, 588, 1956)

Intrinsic viscosity (IV)=½×10$^{-4}$×M$^{0.65}$ (see Doklady, Akad. Nauk. U.S.S.R., 89, 65, 1953)

Logarithmic viscosity=1.00+0.013/2×M$^{0.5}$ (see J. Appl. Physics, 17, 1020, 1946)

Applied coating test

The composition was applied onto a substrate to form a coating of 20 μm thick, which was allowed to stand at room temperature for one hour. The coating on the sample was visually observed for uniformity and rated into the following four grades. A tack-free test was also carried out.

Exc.: uniform coating thickness

Good: some deviations in coating thickness

Fair: deviations in coating thickness and cracks

Poor: a coating is not formed or very thin and readily peelable

Fired film test

The composition was applied onto a substrate to form a coating of 20 μm thick, which was allowed to stand at room temperature for one hour. The sample was fired in an air circulating oven at 400° C. for 30 minutes and cooled down to room temperature. The fired film was visually observed for uniformity and rated into the following four grades.

Exc.: uniform film thickness, no crack

Good: some deviations in film thickness, no crack

Fair: deviations in film thickness and cracks

Poor: a film is not formed

Synthetic Example 1

Synthesis of silicone resin (a-1)

In a 1,000-ml three-necked flask, 100 g of sodium silicate #3, 100 g of 36% hydrochloric acid, and 100 g of isopropyl alcohol were added to 200 g of water to form a clear solution of silicic acid. With stirring, 60 g of $Me_3SiCl$ and 60 g of toluene were added to the solution at room temperature. The mixture was further heated at 80° C. for one hour, from which the aqueous layer was separated off, yielding a toluene solution of a resin. To the toluene solution was added 200 g of a 10% $Na_2SO_4$ aqueous solution. After agitation, the solution was allowed to stand at room temperature. The aqueous layer was separated off. Toluene, 30 g, was added to the reminder, which was heated up to 112° C. for distillation. The remaining solution was dried over anhydrous $Na_2SO_4$ and passed through a paper filter, yielding 81 g of a silicone resin solution containing 51 g of solids. The resin had a $Me_3SiO_{1/2}$ to $SiO_{4/2}$ ratio of 0.8/1.0 and a Mw of 1,600.

Synthetic Example 2

Synthesis of silicone resin (a-2)

To 81 g of the silicone resin solution obtained in Synthetic Example 1 were added 1.0 g of methanesulfonic acid and 30 g of toluene. The mixture was heated up to 112° C. for distillation and refluxed for 4 hours at 112° C. After cooling, 200 g of a 10% $Na_2SO_4$ aqueous solution was added. After agitation, the solution was allowed to stand at room temperature. The aqueous layer was separated off. The remaining organic layer was dried over anhydrous $Na_2SO_4$ and passed through a paper filter, yielding 77 g of a silicone resin solution containing 45 g of solids. The resin had a $Me_3SiO_{1/2}$ to $SiO_{4/2}$ ratio of 0.8/1.0 and a Mw of 4,000.

Synthetic Example 3

Synthesis of silicone resin (a-3)

To 81 g of the silicone resin solution obtained in Synthetic Example 1 was added 1.0 g of methanesulfonic acid. The mixture was heated up to 110° C. for distillation and refluxed for 4 hours at 110° C. Thereafter, 10 g of a 10% KOH aqueous solution and 200 g of xylene were added to the mixture, which was heated up to 137° C. for distillation and refluxed for 8 hours at 137° C. After cooling, 200 g of a 10% $Na_2SO_4$ aqueous solution was added. After agitation, the solution was allowed to stand at room temperature. The aqueous layer was separated off. The remaining organic layer was dried over anhydrous $Na_2SO_4$ and passed through a paper filter, yielding 65 g of a silicone resin solution containing 35 g of solids. The resin had a $Me_3SiO_{1/2}$ to $SiO_{4/2}$ ratio of 0.8/1.0 and a Mw of 30,000.

Synthetic Example 4

Synthesis of silicone resin (a-4)

Into a 500-ml three-necked flask, 100 g of tetramethyl silicate, 60 g of hexamethyldisiloxane, 60 g of isopropyl alcohol, 60 g of toluene, and 2 g of methanesulfonic acid were admitted. With stirring, the mixture was heated for 8 hours at 70° C., 35 g of water was added thereto, and the mixture was heated for a further 8 hours at 70° C. To the mixture was added 200 g of a 10% $Na_2SO_4$ aqueous solution. After agitation, the solution was allowed to stand at room temperature. The aqueous layer was separated off. Toluene, 60 g, was added to the reminder, which was heated up to 112° C. for distillation. The remaining organic layer was dried over anhydrous $Na_2SO_4$ and passed through a paper filter, yielding 140 g of a silicone resin solution containing 88 g of solids. The resin had a $Me_3SiO_{1/2}$ to $SiO_{4/2}$ ratio of 1.2/1.0 and a Mw of 1,200.

Synthetic Example 5

Synthesis of silicone resin (a-5)

Into a 500-ml three-necked flask, 100 g of tetramethyl silicate, 30 g of hexamethyldisiloxane, 60 g of isopropyl alcohol, 60 g of toluene, and 1.4 g of methanesulfonic acid were admitted. With stirring, the mixture was heated for 8 hours at 70° C., 35 g of water was added thereto, and the mixture was heated for a further 8 hours at 70° C. Thereafter, 14 g of a 10% KOH aqueous solution and 280 g of xylene were added to the mixture. The mixture was heated up to 137° C. for distillation and refluxed for 8 hours at 137° C. After cooling, 280 g of a 10% $Na_2SO_4$ aqueous solution was added. After agitation, the solution was allowed to stand at room temperature. The aqueous layer was separated off. The remaining organic layer was dried over anhydrous $Na_2SO_4$ and passed through a paper filter, yielding 250 g of a silicone resin solution containing 30 g of solids. The resin had a $Me_3SiO_{1/2}$ to $SiO_{4/2}$ ratio of 0.5/1.0 and a Mw of 42,000.

Synthetic Example 6

Synthesis of silicone resin (a-6)

Into a 500-ml three-necked flask, 100 g of tetramethyl silicate, 45 g of hexamethyldisiloxane, 80 g of methyltrimethoxysilane, 90 g of isopropyl alcohol, 90 g of toluene, and 2.4 g of methanesulfonic acid were admitted. With stirring, the mixture was heated for 8 hours at 70° C., 52 g of water was added thereto, and the mixture was heated for a further 8 hours at 70° C. To the mixture was added 200 g of a 10% $Na_2SO_4$ aqueous solution. After agitation, the solution was allowed to stand at room temperature. The aqueous layer was separated off. The remaining organic layer was heated up to 112° C. to distill off the solvent. After cooling, the remaining was passed through a paper filter, yielding 165 g of a silicone resin solution containing 85 g of solids. The resin had a $Me_3SiO_{1/2}$ $MeSiO_{3/2}$:$SiO_{4/2}$ ratio of 0.8/0.8/1.0 and a Mw of 3,500.

Synthetic Example 7

Synthesis of silicone resin (a-7)

In to a 500-ml three-necked flask, 100 g of tetramethyl silicate, 45 g of hexamethyldisiloxane, 160 g of methyltrimethoxysilane, 120 g of isopropyl alcohol, 120 g of toluene, and 2.8 g of methanesulfonic acid were admitted. With stirring, the mixture was heated for 8 hours at 70° C., 69 g of water was added thereto, and the mixture was heated for a further 8 hours at 70° C. To the mixture was added 200 g of a 10% $Na_2SO_4$ aqueous solution. After agitation, the solution was allowed to stand at room temperature. The aqueous layer was separated off. The remaining organic layer was heated up to 112° C. to distill off the solvent. After cooling, the remaining was passed through a paper filter, yielding 190 g of a silicone resin solution containing 115 g of solids. The resin had a $Me_3SiO_{1/2}$ $MeSiO_{3/2}$:$SiO_{4/2}$ ratio of 0.8/1.5/1.0 and a Mw of 12,000.

Synthetic Example 8

Synthesis of diorganopolysiloxane (b-1)

A 1,000-ml closed stainless steel container was charged with 800 g of octamethylcyclotetrasiloxane, 0.7 g of 1,3,5,7-tetramethyl-1,3,5,7-tetravinylcyclotetrasiloxane, and 0.06 g of a 10% KOH aqueous solution and heated for 8 hours at 120° C. There was obtained 800 g of methylvinylorganopolysiloxane containing 732 g of solids. It had a viscosity of $4 \times 10^7$ mPa-s.

Synthetic Example 9

Synthesis of diorganopolysiloxane (b-2)

A 1,000-ml closed stainless steel container was charged with 600 g of octamethylcyclotetrasiloxane, 0.5 g of 1,3,5,7-tetramethyl-1,3,5,7-tetravinylcyclotetrasiloxane, 0.06 g of a 10% KOH aqueous solution and 1.0 g of water and heated for 8 hours at 120° C. There was obtained 601 g of methylvinylorganopolysiloxane containing 405 g of solids. It had a viscosity of 4,200 mpa-s.

Synthetic Example 10

Synthesis of diorganopolysiloxane (b-3)

A 500-ml three-necked flask was charged with 200 g of methyldichlorosilane and 30 g of trimethylchlorosilane. With stirring, the mixture was heated at 50° C., 64 g of water was added dropwise over one hour, and the mixture was heated for 8 hours at 70° C. The mixture was allowed to stand at room temperature, and the aqueous layer was separated off. The remaining organic layer was heated for 4 hours at 100° C. Thereafter, 200 g of a 10% $Na_2SO_4$ aqueous solution was added. After agitation, the mixture was allowed to stand at room temperature, and the aqueous layer was separated off. The remaining organic layer was heated up to 110° C. to distill off water. After cooling, the remainder was passed through a paper filter, yielding 100 g of a diorganopolysiloxane containing 88 g of solids. It had a viscosity of $1.8 \times 10^4$ mpa-s.

Example 1

To 135 g of the toluene solution of the silicone resin (a-2) (solids content 85 g) at room temperature, 17 g of toluene was added for dissolution. To the solution was added 15 g of the diorganopolysiloxane (b-1). Agitation was continued at room temperature until uniform, obtaining an organopolysiloxane composition.

Examples 2–8

Organopolysiloxane compositions were prepared as in Example 1 using the silicone resin, diorganopolysiloxane and solvent shown in Table 1.

Example 9

To 135 g of the silicone resin solution (a-2) (solids content 85 g) at room temperature, 17 g of toluene was added for dissolution. To the solution were added 15 g of the diorganopolysiloxane (b-1) and 0.5 g of the diorganopolysiloxane (b-3). Agitation was continued at room temperature until uniform. Immediately before coating, 0.01 g of chloroplatinic acid as a catalyst was added to the organopolysiloxane composition, yielding a coating composition.

For these compositions, the properties of their coatings and the properties of the fired films were examined, with the results being shown in Table 1.

TABLE 1

| | Example | | | | | | | | |
|---|---|---|---|---|---|---|---|---|---|
| | 1 | 2 | 3 | 4 | 5 | 6 | 7 | 8 | 9 |
| Silicone resin | a-2 | a-2 | a-2 | a-2 | a-1 | a-3 | a-6 | a-7 | a-2 |
| (solids content) | 85 g | 95 g | 85 g | 85 g | 85 g | 85 g | 85 g | 85 g | 85 g |
| Diorganopolysiloxane | b-1 | b-1 | b-2 | b-1 | b-1 | b-1 | b-1 | b-1 | b-1 |
| | 15 g | 5 g | 15 g | 15 g | 15 g | 15 g | 15 g | 15 g | 15 g |
| | — | — | — | — | — | — | — | — | b-3 0.5 g |
| Catalyst | — | — | — | — | — | — | — | — | Chloroplatinic acid 0.01 g |
| Solvent | Toluene | Toluene | Toluene | Toluene | Toluene | Xylene | Toluene | Toluene | Toluene |
| | 67 g | 67 g | 67 g | 150 g | 67 g | 67 g | 67 g | 67 g | 67 g |
| Coating tack | nil | nil | nil | nil | nil | nil | nil | nil | nil |
| Coating appearance | Exc. | Exc. | Exc. | Exc. | Exc. | Exc. | Good | Good | Exc. |
| Fired film appearance | Exc. | Good | Good | Good | Exc. | Exc. | Good | Good | Exc. |

Example 10

To 405 g of the silicone resin solution (a-2) (solids content 255 g) at room temperature, 150 g of toluene was added for dissolution. To the solution, 45 g of the diorganopolysiloxane (b-1) was added and uniformly dissolved. This solution was mixed with 60 g of titanium oxide powder in a kneader, yielding a coating composition.

For this composition, the properties of its coating and the properties of the fired film were examined, with the results being shown in Table 2.

Example 11

To 135 g of the silicone resin solution (a-2) (solids content 85 g) at room temperature, 50 g of toluene was added for dissolution. To the solution was added 15 g of the diorganopolysiloxane (b-1). Agitation was continued at room temperature until uniform. To this solution was added 40 g of an acrylic resin solution (solids content 20 g) BPS-8170 from Tokyo Ink K. K. They were mixed into a coating composition.

For this composition, the properties of its coating and the properties of the fired film were examined, with the results being shown in Table 2.

TABLE 2

|  | Example 10 | Example 11 |
| --- | --- | --- |
| Silicone resin (solids content) | a-2 85 parts | a-2 85 parts |
| Non-silicone component (solids content) | TiO$_2$ powder 20 parts | Acrylic resin 20 parts |
| Diorganopolysiloxane | b-1 15 parts | b-1 15 parts |
| Solvent | Toluene 100 parts | Toluene 100 parts |
| Coating tack | nil | tacky |
| Coating appearance | Exc. | Exc. |
| Fired film appearance | Good | Good |

Comparative Examples 1–8

As in Example 1, organopolysiloxane compositions were prepared using the silicone resin, diorganopolysiloxane, non-silicone component, solvent, titanium oxide, and acrylic resin solution shown in Table 3. Note that the acrylic resin solution is BPS-8170 from Toyo Ink K. K.

For these compositions, the properties of their coatings and the properties of the fired films were examined, with the results being shown in Table 3.

TABLE 3

|  | Comparative Example | | | | | | | |
| --- | --- | --- | --- | --- | --- | --- | --- | --- |
|  | 1 | 2 | 3 | 4 | 5 | 6 | 7 | 8 |
| Silicone resin (solids content) | a-2 70 g | a-2 100 g | a-2 85 g | a-2 80 g | a-4 85 g | a-5 85 g | a-2 70 g | a-2 70 g |
| Non-silicone component (solids content) | — | — | — | — | — | — | TiO$_2$ powder 15 g | Acrylic resin 15 g |
| Diorganopolysiloxane | b-1 30 g | — | b-2 15 g | b-1 20 g | b-1 15 g | b-1 15 g | b-1 30 g | b-1 30 g |
| Solvent | Toluene 67 g | Toluene 67 g | Toluene 40 g | Toluene 600 g | Toluene 67 g | Xylene 67 g | Toluene 100 g | Toluene 100 g |
| Coating tack | tacky | nil | nil | nil | nil | nil | nil | tacky |
| Coating appearance | Exc. | Poor | Fair | Fair | Fair | Fair | Poor | Poor |
| Fired film appearance | Poor | Poor | Fair | Fair | Fair | Fair | Poor | Poor |

Comparative Example 9

A silicone sealant KE-54 (solids 100% by weight) from Shin-Etsu Chemical Co., Ltd. was diluted with toluene to form a 60% solution. For this solution, the properties of its coating and the properties of the fired film were examined, with the results being shown in Table 4.

Comparative Example 10

For a silicone hardcoat solution KP-85 (solids 20% by weight) from Shin-Etsu Chemical Co., Ltd., the properties of its coating and the properties of the fired film were examined, with the results being shown in Table 4.

Comparative Example 11

For a silicone pressure-sensitive adhesive solution KR-101-10 (solids 60% by weight) from Shin-Etsu Chemical Co., Ltd., the properties of its coating and the properties of the fired film were examined, with the results being shown in Table 4.

TABLE 4

|  | Comparative Example 9 | Comparative Example 10 | Comparative Example 11 |
| --- | --- | --- | --- |
| Silicone composition | KE-54 60 g | KP-85 100 g | KE-101-10 100 g |
| Solvent | Toluene 40 g | — | — |
| Coating tack | tacky | nil | tacky |
| Coating appearance | Exc. | Exc. | Exc. |
| Fired film appearance | Poor | Poor | Fair |

Japanese Patent Application No. 10-291833 is incorporated herein by reference.

Although some preferred embodiments have been described, many modifications and variations may be made thereto in light of the above teachings. It is therefore otherwise than as specifically described without departing from the scope of the appended claims.

What is claimed is:

1. An organopolysiloxane composition suitable for forming a fired film, comprising (A) 80 to 95 parts by weight of a silicone resin comprising units of $R_3SiO_{1/2}$ and units of $SiO_{4/2}$ in a molar ratio of from 0.6/1 to 1.1/1, wherein R, which may be the same or different, represents hydrogen, hydroxyl groups, alkoxy groups of 1 to 6 carbon atoms, or monovalent hydrocarbon groups of 1 to 6 carbon atoms, (B) 5 to 20 parts by weight of a diorganopolysiloxane represented by formula (1):

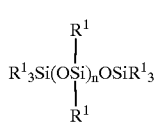

wherein $R^1$, which may be the same or different, represents hydrogen, hydroxyl groups, alkoxy groups of 1 to 6 carbon atoms, or monovalent hydrocarbon groups of 1 to 12 carbon atoms, and n is an integer of at least 1, the amount of components (A) and (B) combined being 100 parts by weight, and (C) from more than 40 to 500 parts by weight of an organic solvent.

2. The composition of claim 1 wherein the silicone resin (A) consists essentially of units of $R_3SiO_{1/2}$ and units of $SiO_{4/2}$ and has a weight average molecular weight of 1,600 to 30,000.

3. The composition of claim 1 wherein the diorganopolysiloxane (B) has a viscosity of at least 5,000 mpa-s at 25° C.

4. The composition of claim 1 comprising 85 to 95 parts by weight of the silicone resin (A) and 5 to 15 parts by weight of the diorganopolysiloxane (B).

5. The composition of claim 1, wherein the silicone resin further comprises units of $R_2SiO_{22}$ and $RSiO_{3/2}$, and is represented by the formula

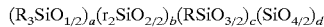

wherein a to d are $0.2 \leq a \leq 0.55$, $0 \leq b \leq 0.40$, $0 \leq c \leq 0.4$, $0.29 \leq d \leq 0.65$ and a+b+c+d=32 1.

6. The composition of claim 5, wherein (a+d)/(a+b+c+d) $\leq 0.6$.

7. The composition of claim 1, wherein R is methoxy, ethoxy, propoxy, butoxy, methyl, ethyl, propyl, butyl, hexyl, vinyl, allyl, propenyl, butenyl, hexenyl or phenyl.

8. The composition of claim 1, wherein R is methyl.

9. The composition of claim 1, wherein the silicon residue (A) has a weight average molecular weight of 3,000 to 10,000.

10. The composition of claim 1, wherein $R^1$ is an alkyl, alkenyl, aryl or aralkyl group, or one of these groups wherein a hydrogen atom directly attached to a carbon atom is replaced by a halogen, epoxy or amino group.

11. The composition of claim 1, wherein $R^1$ is methyl, ethyl, propyl, butyl, hexyl, octyl, decyl, vinyl, allyl, propenyl, butenyl, hexenyl, phenyl, tolyl, benzyl, or phenylethyl.

12. The composition of claim 1, wherein at least 90 mol% of $R^1$ groups are methyl.

13. The composition of claim 3, wherein said viscosity is at least 100,000 mPa-s at 25° C.

14. The composition of claim 1, wherein the diorganopolysiloxane (B) further comprises $RSiO_{3/2}$ and $SiO_{4/2}$ units, wherein the total number of $RSiO_{3/2}$ and $SiO_{4/2}$ units is up to 5 mol% of the recurring siloxane units of the diorganopolysiloxane.

15. The composition of claim 1, wherein the organ solvent is an aliphatic hydrocarbon, aromatic hydrocarbon, alcohol, ketone, or ester.

16. The composition of claim 1, wherein the organ solvent volatilizes below 300° C.

17. The composition of claim 1, wherein the organic solvent is an aliphatic $C_6$–$C_{12}$ hydrocarbon, benzene, toluene or xylene.

18. The composition of claim 1, wherein the amount of organic solvent is from 45 to 250 parts by weight.

19. The composition of claim 1, wherein the amount of organic solvent is from 60 to 200 parts by weight.

* * * * *